Oct. 7, 1969         J. W. GAINES         3,470,856
FOUR STROKE STRATIFIED ENGINE
Filed Jan. 5, 1968

United States Patent Office 3,470,856
Patented Oct. 7, 1969

3,470,856
FOUR STROKE STRATIFIED ENGINE
John W. Gaines, Wheaton, Ill., assignor to International Harvester Company, Chicago, Ill., a corporation of Delaware
Filed Jan. 5, 1968, Ser. No. 695,940
Int. Cl. F02b *29/08;* F01l *1/20*
U.S. Cl. 123—107                                    11 Claims

ABSTRACT OF THE DISCLOSURE

Four-stroke cycle, carburetted, constant compression, spark ignition, stratified charge, piston engine having constant opening, variable closing exhaust valves and variable opening, constant closing intake valves. Valve timing is accomplished by means of a longitudinally slidable camshaft and three-dimensional intake and exhaust cams carried by the camshaft and operating the valve gear so as to provide valve lap in conventional way at full power. At all part power settings, the cams provide exhaust valve closing advance and intake valve opening retard to a point introducing appreciable valve underlap, whereby a part only of the burned gases escapes from each combustion chamber, the space thus vacated being filled with fresh mixture upon the following intake stroke.

---

This application relates to an internal combustion engines Class 123/107 (2) invention, in which each successive charge in the combustion chamber is composed of a portion of the burned gases from the preceding charge, together with a quantity of fresh mixture of air and combustible stratified over the burned gas portion and sufficient in amount to fill the working cylinder and end clearance volume, so that the successive charges are of constant volume and at or substantially at atmospheric pressure at the beginning of the so-called first compression stroke in the working cylinder.

A slidable camshaft is provided to adjust the valve timing, and the valve gear of the engine is positively operated by three dimensional cams carried by the camshaft and actuating the valves to provide the engine with: variable closing exhaust valves, and variable opening intake valves, so that the valve operation can be made to produce selectively minor valve overlap, which is conventional, and major valve underlap. Preferably, but not necessarily, the exhaust valves are constant opening and the intake valves are constant closing in their manner of timing, and a four stroke cycle is employed.

By movement of an operator operated actuator such as an accelerator pedal which is provided, selective camshaft settings are made by which, following the regular or first compression and expansion strokes in the cycle, exhaust valve closing can be advanced to an intermediate point in the exhaust stroke and intake valve opening can be retarded to an intermediate point in the suction stroke to cause a second compression and expansion stroke coextensive with the ensuing valve underlap. As a result, the products of pervious combustion are recompressed and re-expanded, back down to atmospheric pressure, in isolation in each combustion chamber immediately prior to the intake valve initiating communication with the combustion chamber at some intermediate stage of the suction stroke.

The balance of the suction stroke is devoted to induction, into the part filled, enlarging combustion chamber, of a stratified topping off charge of carburetted air which supplies the heat energy for the first expansion or power stroke of the next ensuing cycle. Increasing the proportion of the topping off charge increases the engine speed and power, and vice versa.

The slidable camshaft and three dimensional cams thereon which are provided in accordance with my invention result in a greatly improved and simplified four stroke, stratified engine operation wherein throttling of the carburetion process is not necessarily required to afford effective part power control, as will now be explained in detail.

Features, objects, and advantages will either be specifically pointed out or become apparent when, for a better understanding of my invention, reference is made to the following description, taken in conjunction with the accompanying drawing which shows a preferred embodiment thereof and in which.

Figure 1:
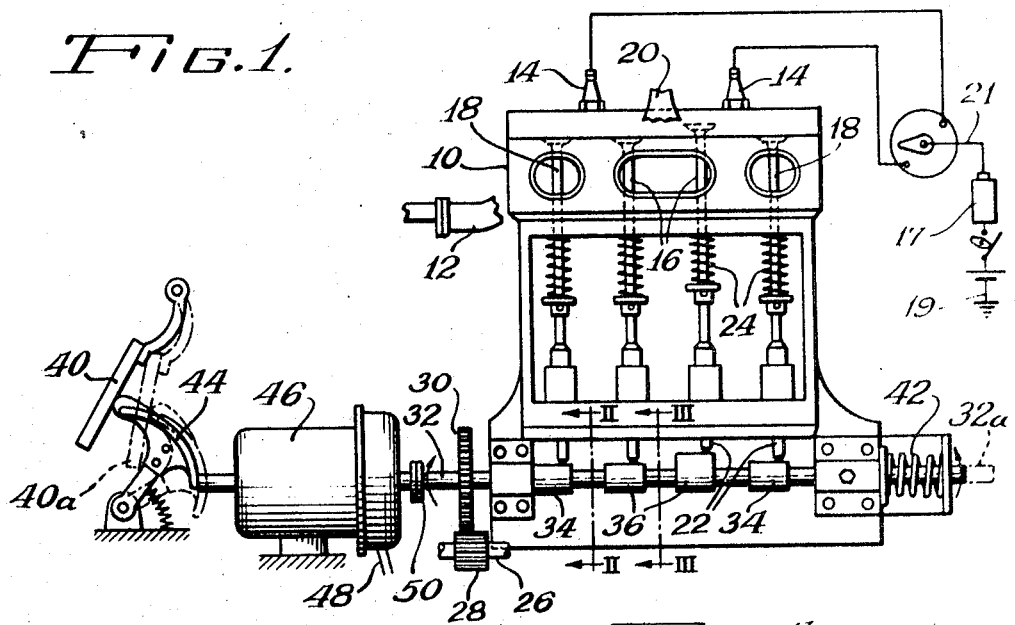
FIGURE 1 is a right side elevational view of an engine embodying the present invention.

More particularly in the drawing, an unthrottled, four stroke cycle, stratified charge, carburetted, exhaust recycling, spark engine 10 for a vehicle is shown having an exhaust manifold 12, and a plurality of combustion chambers each provided with an individual spark plug 14, an intake valve 16, and an exhaust valve 18. Each of the valves has a poppet head which is cyclically displaced into the combustion chamber, each combustion chamber comprising the usual end clearance space and the working cylinder in which the piston reciprocates, none being shown. An intake manifold 20 is fragmentarily shown, interconnecting a downdraft carburetor, not shown, and the ports controlled by the intake valves 16 of the respective combustion chambers.

An ignition coil 17, having a primary circuit 19 including a battery and a timer comprising breaker points, supplies high voltage current to the spark plugs 14 through a secondary circuit 21 including a spark plug wiring harness and a distributor.

The individual valves are operated by a valve opening cam follower 22 and a valve closing spring 24 in timed relation to the engine crankshaft 26. Power for the operation is transmitted in a mechanical path leading from the crankshaft 26, thence thru a longitudinally elongated camshaft drive pinion 28 carried by the crankshaft, a narrow camshaft gear 30 having twice the number of teeth of the drive pinion 28 and meshing therewith, a rotatable and longitudinally slidable camshaft 32 to which the gear 30 is made rotatably and axially fast, to first cams 34 and second cams 36 which are spaced apart along and made fast to the camshaft 32.

The drive pinion 28 and gear 30 accommodate sliding of the camshaft 32 without varying the phase relation to the crankshaft, which drives the camshaft at one-half crankshaft speed. The first named and second named cams 34 and 36, respectively, are three dimensional cams, of which the first cams 34 engage the cam followers which control the exhaust valves. The second cams 36 engage the cam followers 22 which control the intake valves.

It is preferable that the tappets at the lower ends of the cam followers 22 be formed of balls 38 rotatably mounted in sockets. In that way, the tappets accommodate with a universal action, avoiding scuffing during relative axial or rotative movement of the three dimensional cams.

The longitudinal setting of hte camshaft is controlled by driver-operated accelerator pedal 40 of the suspended type located at the rear end of the camshaft, and by an encircling return spring 42 at the front end of the camshaft. Engine speed and power vary with the valve timing and are controlled by the pedal 40 which, for example, reduces the engine output by increasing the proportion of burned gases present at the time each cylinder is fired.

The pedal 40 and the camshaft 32 have an interconnection consisting of a pivoting cam member 44 and a cylinder type servomotor 46. The servomotor 46 acts as a power booster to follow the power setting of the accelerator pedal and is supplied with motive fluid under pressure differing from atmosphere through a pipe 48. The pipe 48 can be connected either to air pressure or the vacuum, supplied for example from a suitable pump, not shown, operated by the vehicle engine 10.

The ramp on the cam member 44 and the servomotor cause the camshaft to operate as a reciprocably positionable cam follower, and a thrust bearing 50 interconnects the servomotor 46 and the rotating camshaft 32 so as to accommodate relative rotation between the two.

Figure 2:
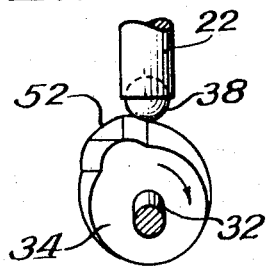
FIGURES 2 and 3 are transverse elevational views showing details of the camshaft, taken along the respective section lines II—II and III—III of FIGURE 1.
Figure 3:
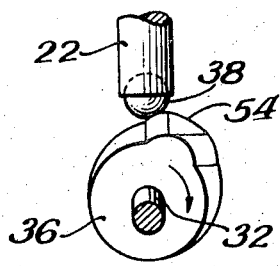

In the conventional phase of its operation, the valve gear as shown in FIGURES 2 and 3 occupies the full power position, corresponding to fully depressed, full power position of the camshaft as shown by the broken lines 32a in FIGURE 1. The accelerator pedal takes a corresponding fully depressed position for full power as shown by the broken lines 40a in FIGURE 1.

Figure 4:
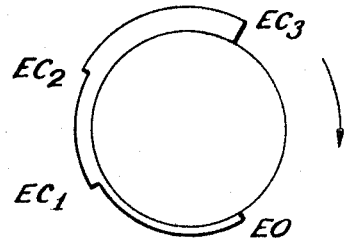
FIGURES 4 and 5 are valve timing diagrams for, respectively, the exhaust valve and the intake valve of the engine.

Consequently, in terms of crankshaft rotation, the exhaust valve remains open for the maximum period of degrees, measured from the point EO in FIGURE 4 to the point EC3 at which the exhaust valve closes to terminate exhaust operation. Similarly, the intake valve remains open for the maximum period, from the point IO3 in FIGURE 5 to the point IC at which the intake valve closes to terminate intake operation.

The lobes of the first and second cams widen in the longitudinal direction (away from the viewer) and afford more duration of lift, with or without more height of lift, with increased depression (i.e., more forward advance) of the camshaft. In case the engine requires increased rated horsepower, the exhaust cam 34 can be provided with a hump in the area 52 forming a protruding nose on the lobe to increase the valve lift during full power operation. In that case, a similar hump would be provided at 54 at the wide end of the lobe of the intake cam 36.

In its novel manner of reducing power output of the engine, the camshaft 32 axially withdraws the sets of first and second cams 34 and 36 in unison in response to progressively retracted settings of the pedal 40 corresponding to decreasing engine power output. In FIGURE 4, it can be seen that the exhaust valve opens at the same relative point during crankshaft rotation, but closes at any intermediate premature point such as EC2 or EC1 thereby allowing only the first portion of combustion products to escape from the combustion chamber. With communication prematurely blocked between each chamber and the exhaust manifold 12, the contents of the combustion chamber are recompressed to high temperature and high pressure at the piston top dead center point, and are then re-expanded back to re-establish atmospheric pressure in the chamber.

Figure 5:
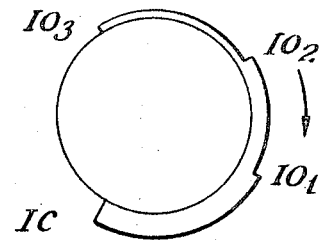

During the corresponding part-load condition of the intake cams, intake valve opening is retarded to some intermediate point such as IO2 or IO1 as shown in FIGURE 5. The coordination is such that when re-expansion has caused the exhaust products in the still enlarging engine cylinder to be at or about atmospheric pressure, the intake valve forthwith opens to fill the balance of the cylinder with a stratified, topping off charge of carburetted combustible mixture, i.e., the premix of fuel and air fed from the intake manifold.

The three dimensional tapered lobe effect of the first and second cams is compatible with the universal action of the ball tappets 38, and the junctures on the cam surfaces are rounded so that smooth rolling action results. Between and including the respective wide and narrow lobed ends of the cam on which it is carried, the ball tappet rides on an infinity of rings of surface contact with the cam.

The exhaust valve tappet engages the ramp of the first cams 34 at the same rotative point irrespective of the longitudinally adjusted position of the camshaft so that, as illustrated, exhausting is actuated by a constant opening valve. However, the open period increases with increased power output requirements of the engine.

The intake valve tappet leaves the flank of the second cams 36 at the same rotative point irrespective of the longitudinal setting of the camshaft 32. However, the period during which the intake valve is open is variable, and intaking or suction is characterized by only the termination being due to a constant closing valve.

To achieve the higher engine efficiencies being sought herein during part power settings, the engine operates unthrottled not only whenever under full load but also whenever under part load. If desired in order to stabilize the engine idling speed, however, the carburetor can be provided with a throttle which is used preferably only at idle, especially if a stabilized but very low idle speed setting is made.

Treating engine products externally of the engine, as by a catalytic muffler or a tail pipe equipped with an afterburner, is materially different in its results from an exhaust recycling process as here, wherein the temperature is raised somewhat higher due to mechanical recompression of the isolated products trapped in the cylinder and the pressure is raised appreciably higher. Moreover at all times during part-load, the regular or so-called first compression is performed in a chamber in good part filled with products of prior combustion, which products are again compressed beginning at substantially atmospheric pressue, characteristic of the present constant compression engine.

The described first and second compressions are differently caused and are different in character in the cycle. On alternate upstrokes in the engine cylinder, compression starts therein as and after the intake valve closes at a fixed point, and a full charge is contained comprising a top mix of unburned air and fuel and bottom stratum of recycled burnt air and fuel mix. On each remaining upstroke, compression starts therein as and after the exhaust valve closes at a variable point, and only part of a charge is present consisting wholly of burnt air and fuel mix to be recycled.

On alternate downstrokes, expansion continues in the engine cylinder so as to deliver power until exhausting starts as and after the exhaust valve opens at a fixed point. On each remaining downstroke, expansion of what is only part of a full charge present is continued only until it (recycled burnt air and fuel mix) reaches atmospheric pressure at a variable point, such point being the one at which the intake valve variably opens to top fill the part charge and complete it so that a full filling or charge will be present in the cylinder.

During full power operation of the engine, recycling is omitted because of resumption of conventional valve operation with overlap, enabling all products of combustion to be displaced from the combustion chamber during each period of exhausting.

In case the camshaft is provided with an overtravel setting in which it slides past the normal full retracted setting, then in that case the exhaust cams are provided with an axial prolongation at their narrow lobe ends. The prolongation is either lobe free or has a narrow and sharp lobe and, in either event, the exhaust valve at most is opened by the prolongation at or slightly ahead of bottom dead center and is forthwith closed at or slightly past that same bottom dead center. Both exhaust discharge and induction charge intake are practically nil because of minimal opportunity for discharge or intake anywhere in the cycle. The overtravel setting will prove advantageous during full coasting of the vehicle, when fuel intake and engine emissions are undesired; hence, it will be beneficial to provide a lobe-free prolongation at the narrow lobe ends of the intake cams so that the valve tappets thereon will remain in a no lift condition preventing the valves from interconnecting the intake manifold and combustion chambers.

What is claimed is:

1. In a four-stroke cycle piston engine provided with an exhaust manifold, and with a plurality of combustion chambers each having intake and exhaust valve means, the latter establishing communication between the exhaust manifold and each respective chamber following its regular or first compression and expansion strokes:

a sliding camshaft for actuating the valve means, carrying first three-dimensional cams for opening the exhaust valve means;

a depressible pedal which, with the release thereof, is movable into progressively retracted settings corresponding to decreasing engine power output;

means interconnecting the pedal and the camshaft for retractively sliding the camshaft upon retractive movement of the pedal for adjusting the closing of the exhaust valve means so that the point in the exhaust stroke at which the latter will block communication between each chamber and the exhaust manifold can be advanced to cause a second compression and expansion stroke in the cycle for recompressing and re-expanding in that chamber the products of previous combustion; and second three-dimensional cams carried by the camshaft for closing the intake valve means following intake in the combustion chambers;

said second cams being so proportioned and positioned with respect to different ones of the first exhaust valve cams that each second cam, upon retractive movement of the pedal, will adjust the opening of the corresponding intake valve means in a manner to retard the point at which the latter will initiate communication with the corresponding chamber until the combustion products can be re-expanded in that chamber down to atmospheric pressure at intermediate stages of the intake stroke.

2. The invention of claim 1:
the exhaust valve means each characterized by a constant opening, variable closing exhaust valve.

3. The invention of claim 1:
the intake valve means each characterized by a variable opening, constant closing intake valve.

4. The invention of claim 1:
the interconnecting means characterized by a power operated servomotor operatively between the pedal and the camshaft.

5. In a four-stroke cycle piston engine having intake and exhaust manifolds, and having a plurality of cylinders individually provided with intake and exhaust valves for connecting same to the respective manifolds, said intake manifold adapted to be supplied exclusively with an unthrottled mix of fuel and air:

first means to actuate the intake valve of each cylinder for blocking intercommunication of the cylinder and intake manifold on each alternate upward stroke of the piston, whereby engine operation is characterized by a constant closing intake valve and a constant compression ratio on first compression;

second means to actuate the exhaust valve of each cylinder for blocking intercommunication of the cylinder and exhaust manifold on each remaining upward stroke, affording a variable closing exhaust valve for providing a second compression in each cycle;

said first and second means comprising respectively first three dimensional cams and second three dimensional cams; and a camshaft common to all cams and longitudinally slidable to vary the valve timing.

6. The invention of claim 5, characterized by:
the second cam being so proportioned and positioned with respect to the camshaft as to provide the engine with a constant opening, variable closing exhaust valve.

7. The invention of claim 5, characterized by:
the first cams being so proportioned and positioned with respect to the camshaft to provide in the engine operation a variable opening, a constant closing intake valve.

8. The invention of claim 5, characterized by:
means to slide the camshaft longitudinally comprising an accelerator pedal operatively connected thereto.

9. Vehicular mounted internal combustion engine having a four-stroke cycle characterized by regular or first compression and expansion strokes, comprising:

valve gear for the engine intake and exhaust valves comprising a longitudinally sliding camshaft and three dimensional intake and exhaust cams mounted to the camshaft for operating the valves;

a driver operated pedal; and means interconnecting the pedal and the camshaft for advancing the closing of the exhaust valve to a point causing a second compression and expansion, and retarding the opening of the intake valve to a point at which the re-expanding combustion products are at or about atomspheric pressure at intermediate stages in the intake stroke, affording an engine operation characterized by a constant opening, variable closing exhaust valve and a variable opening, constant closing intake valve.

10. The invention of claim 9:
the pedal and interconnecting means characterized by a driver operated accelerator pedal and a cam pivoted thereby.

11. The invention of claim 9:
the interconnecting means characterized by a fluid operated servomotor.

References Cited

UNITED STATES PATENTS

| | | |
|---|---|---|
| 1,582,763 | 4/1926 | Lafitte. |
| 1,688,164 | 10/1928 | Tarrant. |
| 2,297,376 | 9/1942 | Walker. |
| 2,528,983 | 11/1950 | Weiss. |
| 3,023,870 | 3/1962 | Udelman. |
| 3,262,435 | 7/1966 | Cribbs _____ 123—90 |

C. J. HUSAR, Primary Examiner